United States Patent
Ayat et al.

(10) Patent No.: US 6,701,391 B1
(45) Date of Patent: Mar. 2, 2004

(54) SYSTEM FOR STOP BUFFERING WHEN A COUNT OF STORED DATA BLOCKS FROM A DVD MATCHES AN ASSOCIATED DATA BLOCK NUMBER OF A REQUESTED DATA BLOCK SET

(75) Inventors: Mehran Ayat, Los Altos, CA (US); Nedi Nadershahi, Pleasanton, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/487,088

(22) Filed: Jan. 19, 2000

(51) Int. Cl.[7] .............................................. G06F 13/14
(52) U.S. Cl. ............................. 710/34; 710/52; 710/74; 711/173
(58) Field of Search ....................... 369/124.01, 124.07, 369/127.08, 47.1, 47.14, 44.29, 44.28; 714/758, 763, 769; 711/4, 111, 112, 170, 173; 710/33, 34, 52, 62, 74

(56) References Cited

U.S. PATENT DOCUMENTS

| | | | | |
|---|---|---|---|---|
| 5,970,208 A | * | 10/1999 | Shim | 348/716 |
| 6,111,831 A | * | 8/2000 | Alon et al. | 369/124.01 |
| 6,119,177 A | * | 9/2000 | Kim | 710/29 |
| 6,137,763 A | * | 10/2000 | Dahan et al. | 369/95 |
| 6,167,551 A | * | 12/2000 | Nguyen et al. | 714/770 |
| 6,233,649 B1 | * | 5/2001 | Hirayama et al. | 360/48 |
| 6,332,176 B1 | * | 12/2001 | Fang et al. | 711/113 |
| 6,414,926 B1 | * | 7/2002 | Sugiyama et al. | 369/53.35 |
| 6,539,518 B1 | * | 3/2003 | Fang et al. | 714/805 |

* cited by examiner

Primary Examiner—Ilwoo Park
(74) Attorney, Agent, or Firm—Pennie & Edmonds LLP

(57) ABSTRACT

A method and apparatus for transferring optical data from a DVD in response to a request from a host. When a data request is issued, a portion of the request containing the target ID for the target data block is used by a comparator circuit to locate the target data block. Another portion of the request containing the number of data blocks requested is used by a monitoring circuit to monitor data block transfer from a DVD to a data buffer once the target data block is located. The monitoring circuit stops data transfer when all of the requested data blocks have been transferred. Each data block is transferred into a data buffer containing areas separated by pointers. In a scratch area of the data buffer, the data block is error corrected, error checked and descrambled. After error checking and descrambling, the data portions of the data block are transferred to a data area in the data buffer, the auxiliary portions of the data block are transferred to an auxiliary area in the data buffer and the status of the error checking is latched into registers. Before any data is transferred from the data buffer to the host through an interface, the data status in the registers is checked. If no error is found in the data, then the corresponding data portions of the data block is transferred to the host.

13 Claims, 4 Drawing Sheets

SYSTEM FOR STOP BUFFERING WHEN A COUNT OF STORED DATA BLOCKS FROM A DVD MATCHES AN ASSOCIATED DATA BLOCK NUMBER OF A REQUESTED DATA BLOCK SET

BRIEF DESCRIPTION OF THE INVENTION

The present invention relates to the field of data management in optical systems, and more particularly, to a method and system for data management in DVD (Digital Video Disc) systems.

BACKGROUND OF THE INVENTION

In optical systems, host computers are typically connected to an optical medium by an interface and a data management system. For example, in a DVD system, the host is connected to a DVD disc via an Advanced Technology Attachment Packet Interface (ATAPI) interface and a DVD interface circuit. A DVD interface circuit typically contains a microprocessor, a buffer, an embedded controller and memory for storing computer programs which run on the controller and the microprocessor. The host could be a personal computer or any other computing platform that is capable of communicating with the ATAPI interface.

When a host issues a request for DVD data, the request is transferred to the DVD interface circuit through the ATAPI interface. The DVD interface circuit processes the request by retrieving the requested data from a DVD disc and transferring the retrieved data to the host through the ATAPI interface. During this process, each component within the DVD interface circuit has tasks to perform. Efficient task allocation and task automation are important design goals for DVD interface circuits. For example, if more tasks are allocated to the embedded controller, less work is demanded of the microprocessor and vice versa. Task automation can be achieved by creating programs which place more reliance on the controller chip than the microprocessor.

Because DVD systems are new to the field of optical system technologies, existing DVD systems typically implement audio CD (Compact Disc) system technologies. CD technologies are not suitable for DVD systems because of the many fundamental differences between CD and DVD data storage structure. Data is stored on CD and DVD discs by data blocks. On CD discs, each data block is a sector of approximately 2K bytes with a corresponding ECC (Error Correction Code) protection per block. Each CD data block is identified by an unique ID. Like CD data blocks, each DVD data block on a DVD disc has an unique ID. In contrast to CD data blocks, however, each DVD data block typically has 16 data sectors of approximately 2K bytes each. Each DVD data block of approximately 32K bytes has only one corresponding ECC protection. Since all 16 sectors of a DVD data block are protected by a common ECC, a DVD data block is sometimes referred to as an ECC Block.

Regardless of the optical media, most hosts read data in units of 2K bytes. In a DVD system, if a host wants to read a single 2K byte sector on a DVD disc, typically, at least one entire data block of approximately 32K bytes needs to be retrieved so that the desired sector can be found and transferred. This large amount of data retrieval makes data management much more difficult in DVD systems than in CD systems. As will be seen below, data management schemes used in CD systems are simply inadequate for DVD systems.

In CD systems, when a host issues a request for CD data, the microprocessor within the CD data management circuit begins to locate a target data sector on a CD disc in response to the request. During the process to locate the target sector, the microprocessor compares every data sector ID retrieved by the controller to the target data ID until the target ID for the target data sector is found. When the target ID is located, the microprocessor switches the controller from a "monitoring" mode to a "buffering" mode so that the controller can begin to buffer data sectors into a data buffer. During the buffering process, the controller continues to buffer data sectors until the microprocessor realizes that enough sectors have been transferred and instructs the controller to stop.

In CD systems, most error checks are performed as data sectors are being stored into a data buffer. Data sectors are generally stored at predetermined locations in the data buffer. Before any CD data is transferred from the buffer to a host, typically, the microprocessor performs a final check by looking in the auxiliary portions corresponding to each data sector in the data buffer. Accessing the data buffer is a time consuming process. Error checking is relatively simple for CD data because each CD data block or sector is only 2K bytes in size.

CD systems rely heavily on the microprocessor and require multiple instructions from the microprocessor to the controller. These heightened demands on the microprocessor may cause delays in transferring of data sectors which may cause the system flow to crash. Any inefficiency in CD systems is exacerbated when the same data management technique is used in DVD systems. Due to the size of each data block in a DVD system, any retrieval of data block related information involves the retrieval of a large amount of information, causing, among other inefficiencies, further delays in data transferring.

In view of the foregoing, it would be highly desirable to provide a system that accommodates the differences in data structure between a CD and a DVD. Such a system should exploit techniques for efficient data management, preferably ones that allocate more tasks to an embedded controller than to the microprocessor.

SUMMARY OF THE INVENTION

This invention provides a method and system for allocating task automation to the embedded controller in a DVD interface circuit. Task automation in the controller is achieved by improvements in the controller hardware and the computer program which provides instructions to the controller.

The controller includes circuits and preprogrammed registers to automatically locate and transfer the requested data blocks. A comparator circuit in the controller compares any retrieved data block IDs to a target data block ID until the target data block is located. A monitoring circuit in the controller monitors the number of data blocks transferred to a data buffer to ensure that the controller automatically stops transferring data blocks when all of the requested data blocks have been transferred.

In this invention, the data buffer has a number of areas separated by preprogrammed automatic pointers. Each area defined by automatic pointers can locate anywhere in the data buffer. This automatic storage of portions of the data block in appropriate areas of the data buffer facilitates more efficient transfer of the data portion to the host by allowing uninterrupted data transfer.

Data blocks are corrected and checked in the data buffer for any error. The results of the error correction and checking are latched into a set of registers within the controller. Just prior to transfer of data to a host, the data status in the registers is checked. The registers are preprogrammed to automatically update the status of data check for each data block. Using registers in the controller to automatically monitor the status of data blocks reduces the burden on the microprocessor and increases efficiency.

This invention greatly increases controller task automation, reduces cost and improves efficiency of data transfer to a host.

DETAILED DESCRIPTION OF PREFERRED EMBODIMENTS

Figure 1:
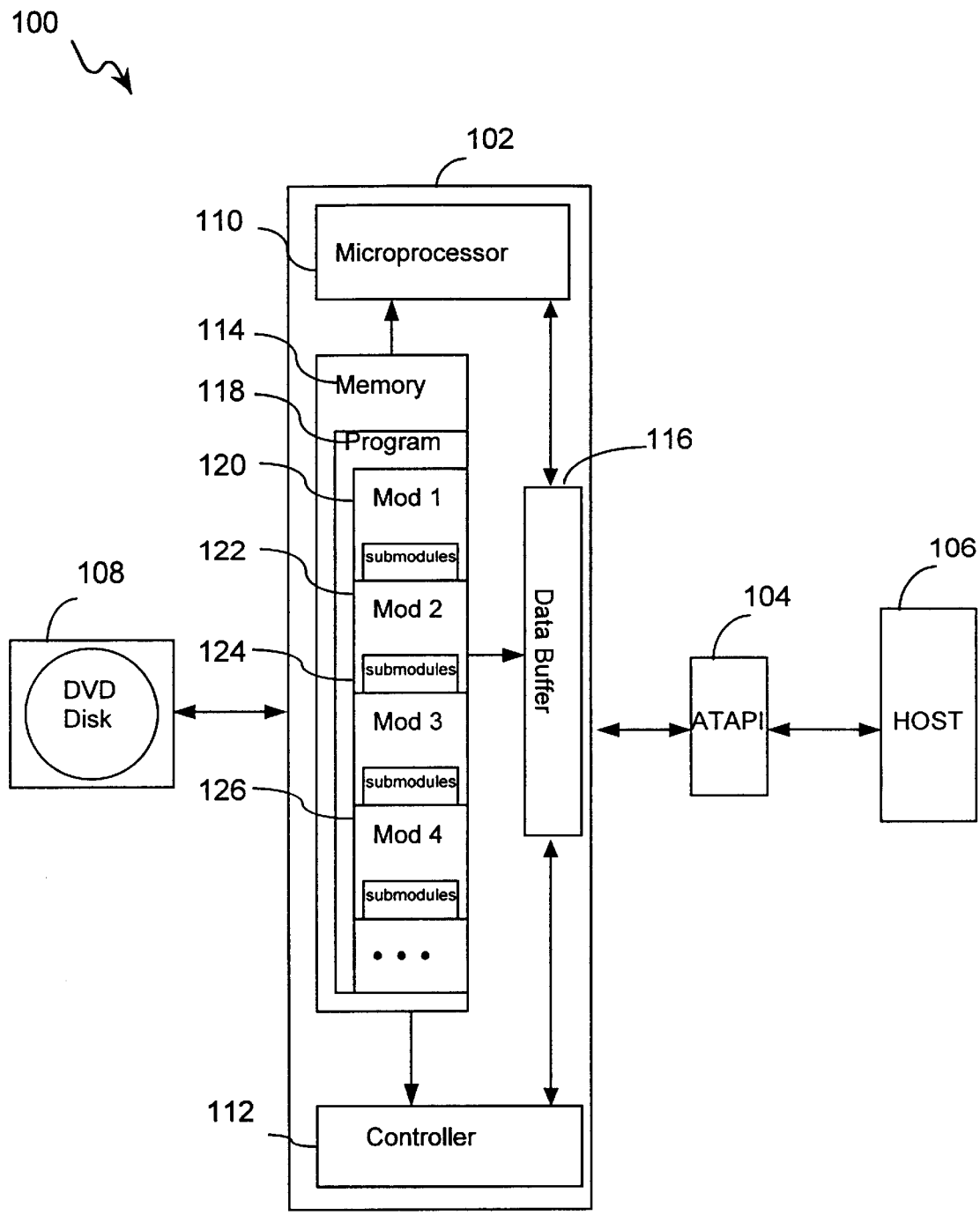
FIG. 1 is a block diagram of a system in accordance with an embodiment of the invention.

FIG. 1 shows an exemplary embodiment of this invention. The exemplary system 100 contains a DVD interface circuit 102 which operates as an interface between a DVD disc drive 108 and a host 106. The DVD interface circuit 102 includes an ATAPI interface 104, microprocessor 110, a controller 112, a memory 114 and a data buffer 116. The memory 114 includes a program 118 having a number of executable modules, 120–126, respectively. The executable modules, 120–126, contain submodules configured for various tasks.

When the host 106 issues a data request, the DVD interface circuit 102 processes the request by retrieving requested data block(s) from a DVD associated with a DVD disc drive 108, storing the retrieved data block(s) in the data buffer 116, then transferring the data block(s) to host 106 through the ATAPI interface 104.

In an exemplary embodiment, program 118 provides instructions to microprocessor 110 and controller 112 by using a number of executable modules, 120–126, and their respective submodules. The executable modules include a data retrieve module to retrieve data from the DVD in response to data requests from the host, a data store module to store data into the buffer using a plurality of pointers; and a data transfer module to transfer data to the host via the input/output interface.

Figure 2:
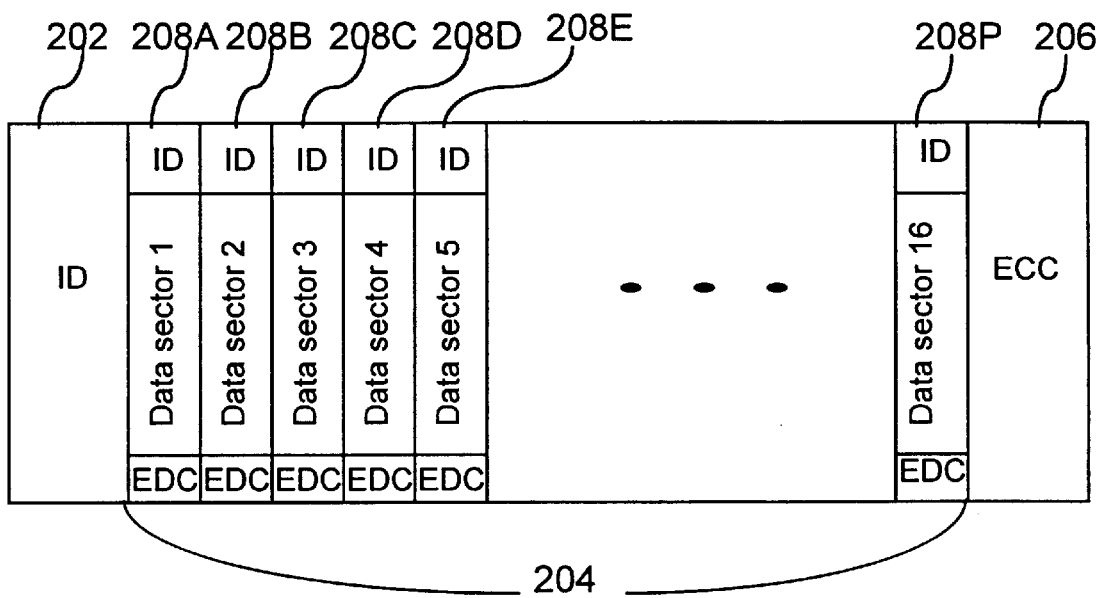
FIG. 2 is a block diagram representing a typical data block in an exemplary embodiment of the invention.

FIG. 2 is a block diagram representing the typical components of a DVD data block in an exemplary embodiment. The data block 200 includes an ECC (Error Correction Code) protection 206 and a data component 204 which includes sixteen data sectors, 208A–208P. Each data sector 208 in the data component 204 has an ID and an EDC (Error Detection Code) byte.

Figure 3:
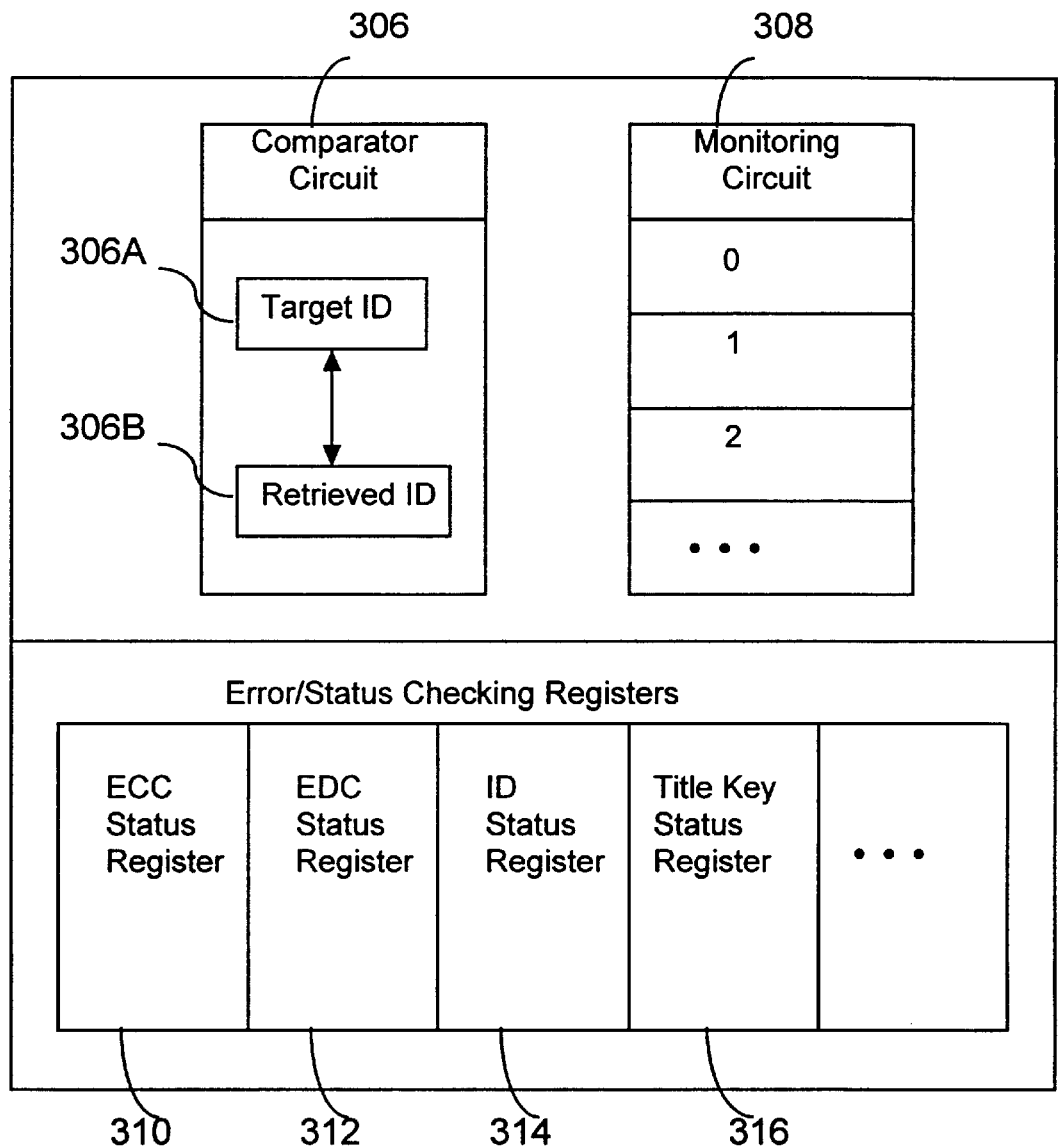
FIG. 3 is a block diagram of a portion of the controller in accordance with an embodiment of the invention.

FIG. 3 illustrates a portion of a controller 112 in an exemplary embodiment. In this embodiment, the controller 112 includes a comparator circuit 306 for locating the target data block and a monitoring circuit 308 for monitoring data block transfer. The comparator circuit 306 records a target data block ID 306A to compare to a retrieved data block ID 306B. The retrieved data block ID 306B is continuously updated until a retrieved data block ID 306 matches the target ID 306A. The monitoring circuit 308 monitors the number of data blocks transferred from a DVD to the data buffer 116. The monitoring circuit 308 stops the controller 112 from transferring more data to the data buffer 116 when all of the requested data blocks are transferred.

The controller 112 also includes a series of registers 310–316 which record the status of error correction and error checking in the data buffer 116. These series of registers include: an ECC status register 310, an EDC status register 312, an ID error status register 314 and a title key status register 316. The ECC 310, EDC 312 and ID error 314 status registers contain data block status information after each data block has been corrected and checked in the data buffer 116. Since each DVD data block has one set of ECC protection around it, the ECC register 310 is typically one bit in size. Each of the sixteen sectors of a DVD data block has ID and EDC bytes; thus, typically the EDC register 312 and ID error register 314 contains sixteen bits each. If the DVD is a protected medium (i.e. movie disc), the title key register 316 may be used. The title key register 316 contains the title status of a data block to prevent copying of the data content.

Figure 4:
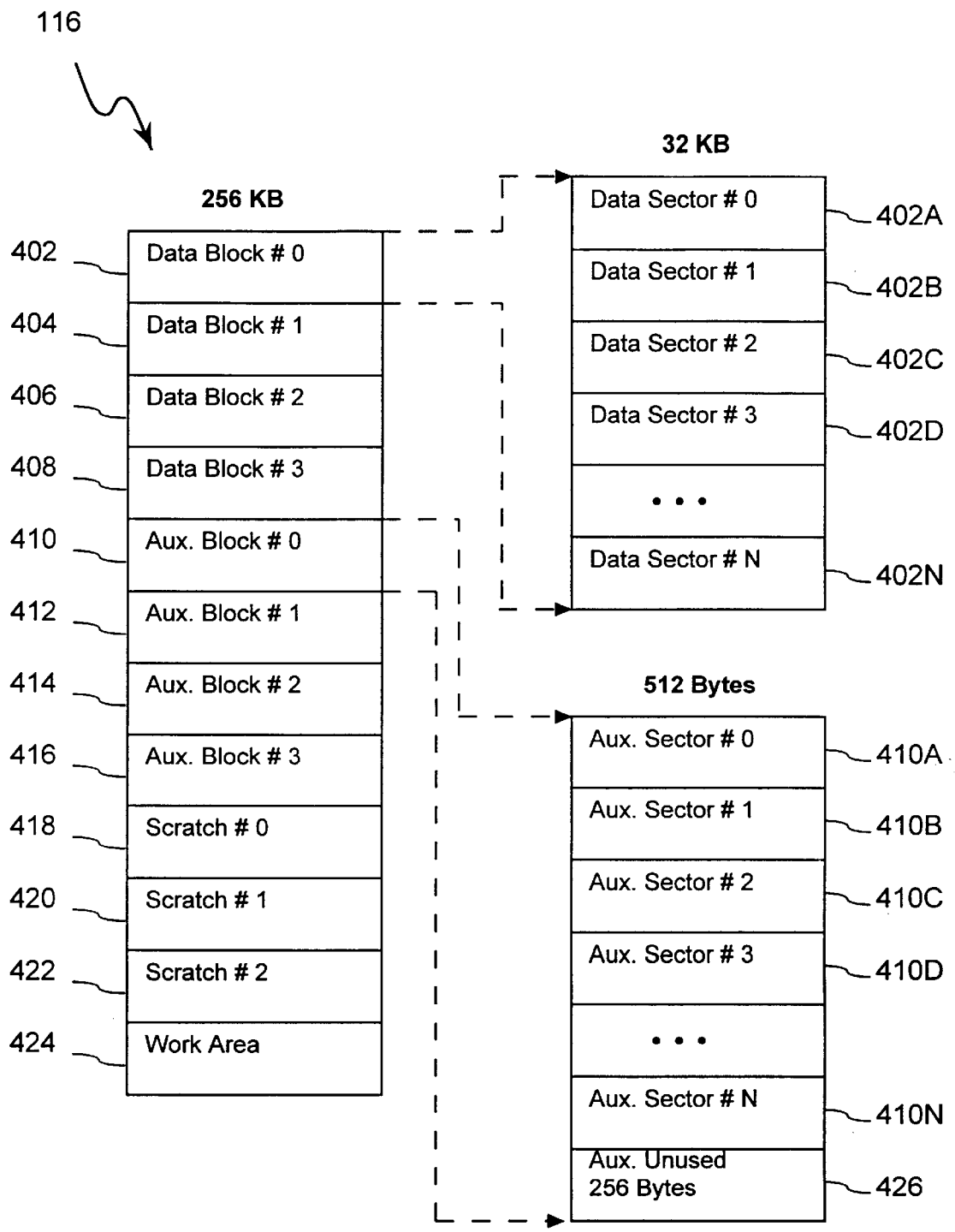
FIG. 4 is a block diagram of a data buffer in accordance with an embodiment of the invention.

FIG. 4 shows an exemplary embodiment of a data buffer 116. The exemplary data buffer 116 has approximately 256 K bytes and is partitioned into four general areas: data areas 402–408, auxiliary areas 410–416, scratch areas 418–422 and work area 424. Each data area 402–408 has a corresponding auxiliary area 410–416. Each data area is approximately 32K bytes and is further divided into sectors, 402A–402N. Typically, each data block has sixteen sectors and each sector has 2K bytes. Each corresponding auxiliary area 410–416 is approximately 512 bytes and is divided such that each data sector has a corresponding auxiliary sector 410A–410N in the auxiliary area. The auxiliary area 410–416 may contain any unused portion 426. In this embodiment, the data buffer 116 has three scratch areas 418–422 each of approximately 36K bytes. In an exemplary embodiment, data blocks are first transferred into the scratch areas 418–422 to be corrected, then checked and descrambled. During the descrambling process, the data portions of the data sectors 208 (see FIG. 2) are separated from the auxiliary portions which includes the ECC protection 206 and the ID and EDC portions of each data sector 208. After a data block is corrected, checked and descrambled, the data portions of the data sectors 208 are moved to data areas 402–408, the auxiliary portions are moved to the corresponding auxiliary areas 410–416 and error checking status is latched into registers 310–316, as applicable.

In response to a host request containing a target ID for a target data block, the controller 12 in the DVD interface circuit 102 retrieves the IDs of data blocks near the target data block from a DVD. In an exemplary embodiment, a comparator circuit 306 in the controller 112 compares the retrieved data block IDs 306B (FIG. 3) with the target ID 306A until the target data block is located. When a match is found between a retrieved ID and the target ID, the comparator circuit 306 allows the controller 112 to automatically begin buffering data block(s) into a data buffer 116 starting from the target data block.

In an exemplary embodiment, a monitoring circuit 308 in the controller 112 is used to monitor data block transfer and to automatically stop data transfer when all of the requested data blocks have been transferred by the controller 112. For example, a host request indicating the number of data blocks requested is used by the monitoring circuit to monitor the number of data blocks transferred. In one embodiment, a numerical value representing the number of requested data blocks is decremented each time a data block is transferred to a data buffer 116. When the numerical value becomes zero, the controller stops transferring data blocks. The numerical value can be replaced by other suitable values such as binary numbers.

Once a target data block is found at least one data block is automatically transferred and stored into a data buffer 116 (FIG. 4). The data buffer 116 is partitioned into various areas including: the data area 402–408, auxiliary area 410–416, scratch area 418–422, and work area 424. In an exemplary embodiment, the data buffer 116 is partitioned by preprogrammed automatic pointers.

For example, the data area 402–408 in the buffer 116 stores the data to be sent to the host 106. The auxiliary area 410–416 stores the auxiliary data. Generally, a data block is first transferred into a scratch area 418–422 from a DVD. Error correction and checking of data blocks are performed in the scratch areas 418–422 of the data buffer 116. After error correcting and checking in the scratch area 418–422, the data portion of the data block is moved to the data area 402–408 and auxiliary portions are moved into a corresponding auxiliary area 410–416. Error checking status information is latched into registers 310–316 which will be explained in more detail below.

In one embodiment, the number of data blocks that can be stored in a data buffer 116 can be calculated by subtracting any fixed areas from the total DRAM memory size and dividing the difference into approximately 32K byte data blocks plus a corresponding approximately 512 bytes per auxiliary area. There should not be any partial block areas of less than approximately 32K bytes. Examples of fixed areas include the scratch areas 418–422, work area 424 and approximately 512 bytes of auxiliary area 410–416 for each data block. Each of these areas can be located anywhere in the buffer 116 and are accessed by using preprogrammed automatic pointers.

In an exemplary embodiment, the data buffer 116 has a start data pointer, an end data pointer, an auxiliary start pointer, a current data pointer, a current auxiliary pointer and a pointer for each scratch area. Each pointer is capable of automatic wrap around when it reaches the end of a particular area. Scratch pointers are programmed to indicate the start of the scratch areas. Data pointers are programmed to indicate the start and end of the data area. The start of the auxiliary area, which is typically after the end of the data area, is programmed by the auxiliary start pointers. In order to indicate the location of data in the data area 402–408, a current data pointer is programmed with an approximately 32K byte increment from the start data pointer. A current auxiliary pointer is programmed with the same offset block number as the current data pointer except with a 512 byte increment from the auxiliary start pointer. Once a current data pointer reaches a data end pointer, the current data pointer wraps around the data area automatically to the data start pointer provided that the available data area is at least approximately 32K bytes. The auxiliary area 410–416 typically does not require an end pointer because the current auxiliary pointer wraps around automatically when the current data pointer wraps around. The automatic wrap-around feature helps to maintain a consistent offset between areas in the data buffer 116. Thus, information in one area of the data buffer (i.e. data area) is prevented from spilling over to anther area of the data buffer (i.e. auxiliary area).

In an exemplary embodiment, the work area 424 is reserved for storing housekeeping information that may need to be readily available, such as lead-in information for the DVD operation. This information can be transferred to the host through the microcontroller address/data bus. In an exemplary embodiment, the work area 424 is configurable by system users to a fixed size based on the amount of data to be stored in the area.

Generally, as data blocks are being transferred from a DVD, these data blocks enter the scratch areas 418–422 of the data buffer 116 where error correcting and checking processes are performed. If there are too many errors in a data block, the error correcting and checking processes may not be able to finish within the allowed time and the errors may become uncorrectable.

An uncorrectable error in a data block may prevent a transfer of requested data to a host 106. For example, if the host 106 requests five data blocks and an uncorrectable error occurs in the third data block, the first two data blocks will be transferred and the system may retry the transfer process for the remaining blocks starting from the third block.

In an exemplary embodiment, if the host requests less than one entire data block and a data error (i.e., EDC or ID error) occurs anywhere in the data block other than in the requested data sectors, the system may still transfer the requested data sectors instead of rejecting the entire data block.

In the present invention, task automation in the controller is greatly improved; thus, reliance on faster and more expensive microprocessors is greatly reduced. For example, when locating a target data block, instead of using the microprocessor to check every approximate ID retrieved by the controller as in CD systems, the controller in the present invention locates the target ID automatically without involving the microprocessor. Also, instead of relying on the microprocessor to switch the controller to buffering mode once the target data block is located as in CD systems, the controller in the present invention automatically begins buffering data blocks once the target data block is found. In addition, instead of using the microprocessor to stop the controller from transferring more data blocks to the buffer when all requested data blocks have been transferred as in CD systems, the controller in the present invention keeps track of the number of requested data blocks and automatically stops transferring data when all requested data blocks have been transferred. Additional advantages of the present invention include: storing portions of data blocks in appropriate sections of the data buffer to facilitate uninterrupted transfer of data to the host; and latching error check status of each data block into a number of registers for quick access before data is transferred to the host.

It will be apparent, therefore, that variations and modifications may be made to the described embodiments, with the attainment of all or some of the advantages. It is the object of the appended claims, therefore, to cover all such variations and modifications as come within the spirit and scope of the invention.

What is claimed is:

1. A method for transferring data from a DVD medium to a host, comprising the steps of:

receiving, at a DVD interface, a request for a data block set issued from a host, wherein the requested data block set has an associated target data block ID and data block number;

obtaining the requested data block set from a DVD medium; and transferring the data the host;

wherein the obtaining is performed by a controller, which is within the DVD interface, by:

retrieving a stream of data blocks, from the DVD medium, each retrieved data block having an associated data block ID;

comparing the data block IDs of the retrieved data blocks until a match is found with the target block ID, using a comparator circuit associated with the controller;

starting with the data block whose data block ID matches the target block ID, storing the retrieved data blocks into a buffer; and stopping the storing of data blocks into the buffer when a count of the stored data blocks matches the data block number.

2. The method of claim 1, where said retrieving step includes the steps of:

recording a value in a register, said value representing a number of data blocks in said data block set requested by said host; and decrementing said value in said register as each of said data blocks are retrieved until all requested data blocks have been retrieved.

3. The method of claim 1, further comprising, before said storing step, the step of using pointers to divide said buffer into said plurality of areas including: a data area, an auxiliary area and a scratch area.

4. The method of claim 3, wherein said storing step includes the steps of:

automatically storing said data block set into said scratch area of said buffer;

processing said data block set within said scratch area;

automatically storing a data portion of said data block set into said data area and an auxiliary portion of said data block set into said auxiliary area; and latching a data status of said data block set into a plurality of registers.

5. The method of claim 4, wherein said processing includes: ECC correction, EDC checking and descrambling.

6. The method of claim 4, wherein said transferring step includes the steps of:

checking said data status in said plurality of registers; and transferring a data portion of said data block set to said host if no error is found in said data status.

7. A system for transferring data from an optical medium to a host, comprising:

an input/output interface configured to receive from a host a request for a data block set, to obtain the requested data block set from a DVD, and to transfer the data block set to the host, wherein the requested data block set has an associated target data block ID and data block number;

the input/output interface including:

a microprocessor;

a memory storing a program having a plurality of modules executable by the microprocessor;

a data buffer; and a controller, distinct from the microprocessor, the controller comprising a comparator circuit and a monitor circuit, the controller configured to:

retrieve a stream of data blocks, from the DVD medium, each retrieved data block having an associated data block ID;

using the comparator circuit, compare the data block IDs of the retrieved data blocks until a match is found with the target block ID;

starting with the data block whose data block ID matches the target block ID, storing the retrieved data blocks into a buffer; and using the monitor circuit, stop the storing of data blocks into the buffer when a count of the stored data blocks matches the data block number.

8. The system of claim 7, wherein said controller includes a register configured to be used by the comparator circuit to continuously select a data block ID and compare said selected data block ID to said a target block ID until a match is found.

9. The system of claim 7, wherein said controller includes a register configured to be used by the monitor circuit to monitor a number of data blocks requested by said host such that said controller stops transferring data blocks from said DVD when all of the requested data blocks have been transferred.

10. The system of claim 7, wherein said buffer includes: a data area, an auxiliary area, a scratch area and a work area.

11. The system of claim 10, wherein said scratch area is configured to be used for processing data transferred from said DVD.

12. The system of claim 11, wherein said processing includes ECC correction, EDC checking and descrambling.

13. The system of claim 7, wherein said controller includes a plurality of registers configured to be used for status checking before data is transferred to said host from said buffer.

* * * * *